Sept. 23, 1924.
W. M. HEAD
FOOT PEDAL EXTENSION
Filed July 12, 1923
1,509,294
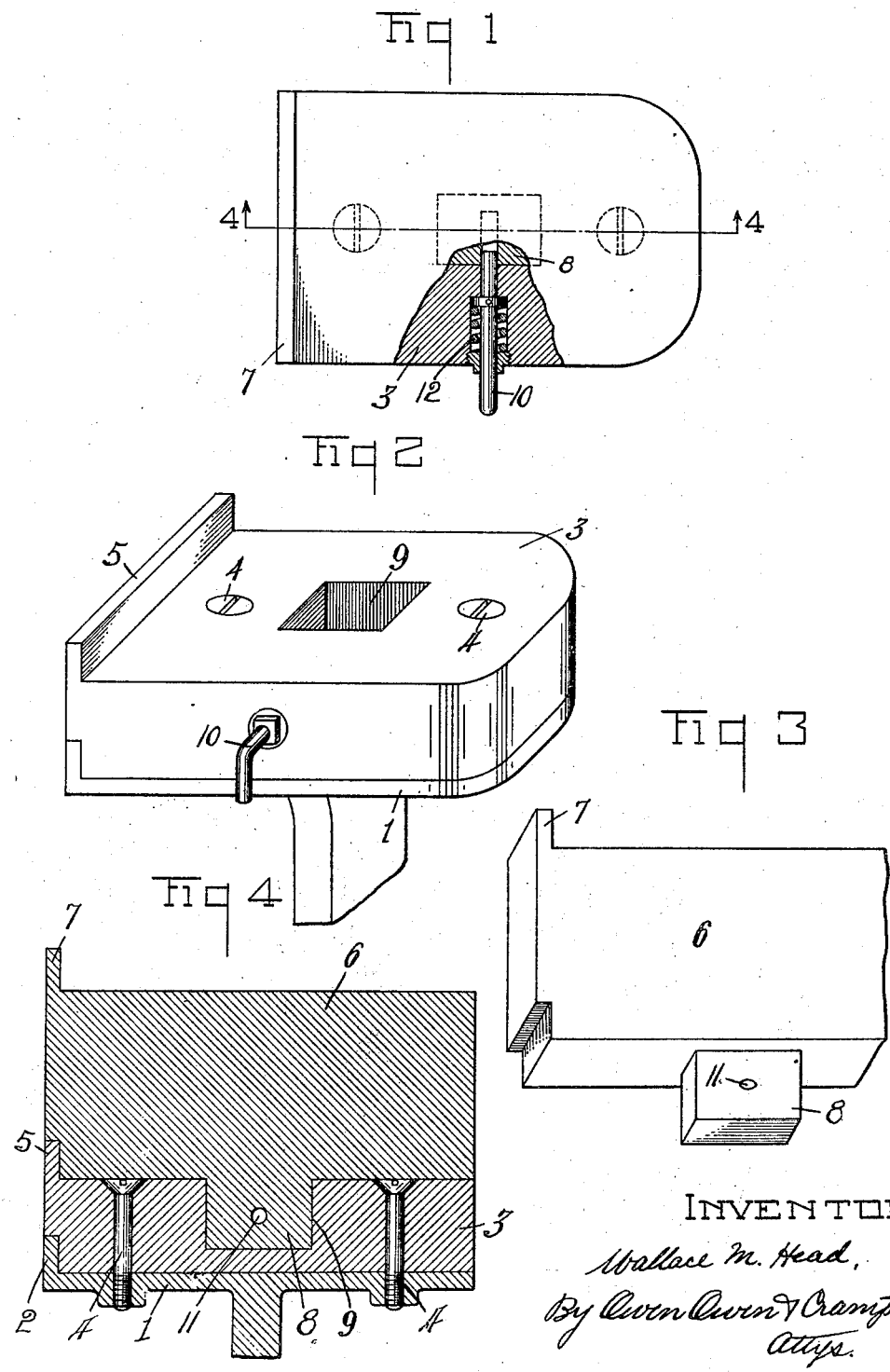

Patented Sept. 23, 1924.

1,509,294

UNITED STATES PATENT OFFICE.

WALLACE M. HEAD, OF TOLEDO, OHIO.

FOOT-PEDAL EXTENSION.

Application filed July 12, 1923. Serial No. 651,022.

*To all whom it may concern:*

Be it known that I, WALLACE M. HEAD, a citizen of the United States, and a resident of Toledo, in the county of Lucas and State of Ohio, have invented a new and useful Foot-Pedal Extension, which invention is fully set forth in the following specification.

This invention relates to extension means for the foot pedals of motor cars, and has for its object the provision of simple and efficient means of this character which can be easily and quickly attached to or detached from a pedal as may be desired.

The invention is fully described in the following specification, and while in its broader aspect it is capable of embodiment in numerous forms, a preferred embodiment thereof is illustrated in the accompanying drawing, in which, Figure 1 is a top plan view of a pedal extension in position on a pedal and with a part broken away. Fig. 2 is a perspective view of a portion of a pedal with a permanent extension pad member secured thereto. Fig. 3 is a fragmentary perspective view of the extension pad member of the pedal, and Fig. 4 is a section on the line 4—4 in Fig. 1.

Referring to the drawings, 1 designates the upper end portion of a foot pedal having an upstanding flange or lip 2 at one or both ends thereof. A permanent extension member or pedal base 3 is secured to the pedal 1 in the present instance by screws 4 and corresponds in shape to that of the top portion of the pedal, having an upstanding flange 5 at one or both ends thereof as may be desired. The lower end edge of the member 3 is recessed to seat over the pedal flange 2.

The temporary extension member 6 of the pedal corresponds in shape to the member 3 and seats thereon with an end edge thereof recessed and seating over the end flange 5 of the member 3. The extension member 6 may be of any depth depending on the desired extension which it is desired to give to the pedal, and an upper edge thereof is provided with a stop flange 7. The extension member 6 is releasably secured to the member 3 by providing a tongue 8 on the bottom of the former which fits into a complemental socket 9 in the top of the base member 3. A pin 10, in the present instance, is mounted for longitudinal movements in a side of the member 3 and enters a hole 11 in the tongue 8 to retain the members 3 and 6 in assembled relation. A spring 12 (Fig. 1) acts on the pin 10 to normally retain it projected into the socket 9 and into the hole 11 of the tongue 8 when the tongue is in said socket.

It is evident that the base member 3 is permanently attached to the pedal 1 and that the extension member 6 may be easily and quickly attached to the member 3 or detached therefrom as desired. For instance, if two people of different height or having different reaches drive a car at different times, the extension member 3 adapts the pedal for use by the person having the long reach and the extension 6 adapts the pedal for use by the person having the short reach.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent, is—

1. The combination with a foot pedal, of two separable foot pad members detachably mounted one over the other on the pedal and capable of use together, or the inner one capable of use alone, as pedal extensions.

2. The combination with a foot pedal, of an extension member detachably mounted on the foot engaging portion of the pedal and substantially covering the same, and a second extension member capable of being detachably mounted on the first extension and substantially covering the same.

3. The combination with a foot pedal having a foot seat with an upstanding flange at a side edge thereof, of an extension member detachably mounted on the foot seat of the pedal and engaging over the flange detachably mounted and itself having an upstanding side flange corresponding to the pedal flange, and a second extension member adapted to be detachably mounted on the first member and engaging over the flange thereof and having an upstanding flange at a side edge thereof, the pedal or the first extension, or the first and second extensions combined with the pedal, being capable of use depending on the length of pedal requirements.

In testimony whereof I have hereunto subscribed my name to this specification.

WALLACE M. HEAD.